(12) United States Patent
Schmidt et al.

(10) Patent No.: US 10,006,098 B2
(45) Date of Patent: Jun. 26, 2018

(54) METHOD FOR THE HYDROLYSIS OF PELLETIZABLE BIOMASSES USING HYDROHALIC ACIDS

(71) Applicant: GREEN SUGAR GMBH PRODUKTINNOVATIONEN AUS BIOMASSE, Meißen (DE)

(72) Inventors: Matthias Schmidt, Dresden (DE); Frank Kose, Berlin (DE)

(73) Assignee: Green Sugar AG, Meissen (DE)

( * ) Notice: Subject to any disclaimer, the term of this patent is extended or adjusted under 35 U.S.C. 154(b) by 312 days.

(21) Appl. No.: 14/435,180

(22) PCT Filed: Oct. 11, 2013

(86) PCT No.: PCT/DE2013/000592
§ 371 (c)(1),
(2) Date: Apr. 13, 2015

(87) PCT Pub. No.: WO2014/056484
PCT Pub. Date: Apr. 17, 2014

(65) Prior Publication Data
US 2015/0275320 A1    Oct. 1, 2015

(30) Foreign Application Priority Data

Oct. 13, 2012 (DE) .................. 10 2012 020 166

(51) Int. Cl.
| | | |
|---|---|---|
| *C13K 1/00* | (2006.01) | |
| *C13K 1/02* | (2006.01) | |
| *C13K 13/00* | (2006.01) | |
| *B01J 19/24* | (2006.01) | |
| *C08H 7/00* | (2011.01) | |
| *C08H 8/00* | (2010.01) | |

(52) U.S. Cl.
CPC .................. *C13K 1/02* (2013.01); *B01J 19/24* (2013.01); *C08H 6/00* (2013.01); *C08H 8/00* (2013.01); *C13K 1/00* (2013.01); *C13K 13/00* (2013.01); *B01J 2219/187* (2013.01); *B01J 2219/24* (2013.01)

(58) Field of Classification Search
CPC ... C13K 1/00; C13K 1/02; C13K 1/13; C13K 13/00; B01J 19/24; B01J 2219/24; B01J 2219/187; C08H 6/00; C08H 8/00
See application file for complete search history.

(56) References Cited

U.S. PATENT DOCUMENTS

| | | | |
|---|---|---|---|
| 4,199,371 A | 4/1980 | Armanet et al. | |
| 7,993,594 B2 * | 8/2011 | Wei ....................... | B01J 8/0055 422/141 |
| 9,371,612 B2 * | 6/2016 | Leavitt ..................... | D21C 1/04 |
| 2009/0050134 A1 | 2/2009 | Friend et al. | |
| 2011/0263799 A1 * | 10/2011 | Haan .................... | C08G 63/785 526/64 |

FOREIGN PATENT DOCUMENTS

| | | |
|---|---|---|
| DE | 3539492 A1 | 5/1987 |
| JP | 2007289961 A | 11/2007 |
| JP | 2012161275 A | 8/2012 |
| WO | 9424316 A1 | 10/1994 |
| WO | 0078446 A2 | 12/2000 |
| WO | 2006110902 A1 | 10/2006 |

OTHER PUBLICATIONS

The Translation of the Written Opinion for PCT/DE2013/000592, dated Oct. 2012.*

* cited by examiner

*Primary Examiner* — David A Reifsnyder
(74) *Attorney, Agent, or Firm* — Michael Soderman

(57) ABSTRACT

The invention relates to the hydrolytic breakdown of plant biomasses via hydrohalic acids, preferably so-called hydrochloric acid. Ligneous biomasses were preferably hydrolyzed in the past because other types of biomasses, for instance straw, are only able to be filled into the reactors with a very low density and they tend towards compacting in the course of the process. The invention solves this problem with two modifications. First of all, pelletizable biomasses are completely or partially loaded in the form of pellets and a heavily increasing filling density is achieved because of that. Secondly, the hydrolysis reactors are tilted, preferably arranged between 30° and 60°, and compacting is prevented. The economic effectiveness of both modifications is to be determined in practical tests for every pelletizable biomass. It is possible that one of the two modifications can be omitted.

7 Claims, No Drawings

METHOD FOR THE HYDROLYSIS OF PELLETIZABLE BIOMASSES USING HYDROHALIC ACIDS

CROSS-REFERENCE TO RELATED APPLICATIONS

This application is the U.S. national stage of International Application No. PCT/DE2013/000592 filed on Oct. 11, 2013, and claims the benefit thereof. The international application claims the benefit under 35 USC 119 of German Application No. DE 102012020166.4 filed on Oct. 13, 2012; all applications are incorporated by reference herein in their entirety.

BACKGROUND

Prior Art

It is generally known that plant biomasses can be broken down via hydrohalic acids to the effect that the carbohydrates existing in the plant in the form of cellulose, hemicellulose, starch and/or oligomerized carbohydrates are extracted, depolymerized via the acid and dissolved in the acid. A number of methods are known; only the Bergius-Rheinau process has prevailed on an industrial basis. The general principle of hydrolysis was realized in upright and cascaded reactors; the acid was routed in various concentrations through the reactors (see DE 927139).

This process was preferably applied to softwood, however. The reason for this restriction is briefly mentioned in the patent DE 3539492. It is accordingly important for the "lignin particles remaining after hydrolysis to have enough strength that the sugar—hydrochloric acid solution can still flow through the lignin layer and that the lignin structure is not caked into a solid mass that no longer permits filtration". In particular, "weakly lignified annual plants" . . . "were no longer able to be processed according to this method or were only capable of being processed under very difficult conditions". The mechanism for this "caking" was able to be clarified in separate investigations, and a simple apparatus-based solution was able to be found.

Furthermore, a solution to the above-mentioned problem is provided in the patent DE 3539492. The biomass is mixed together with hydrochloric acid and HCl gas in a reactor via circulation through a cooling unit, and the heat that arises in the process is simultaneously carried off. This approach was tested, as stated in the patent, on a laboratory scale for straw, as an example, and achieved good results. The fact that high concentrations of solid substances were able to be achieved (30% dry solid matter in the solution) is to be emphasized here. This is in fact also possible in the classic process via the use of vertically standing reactors, but the acid has to be pumped through a considerably larger volume because the density of the filling of straw chaff, for instance, is about 0.06-0.1 kg/l. This requires a much larger number of reactors for the same throughput of biomass, which leads to a considerable increase in investment costs in the end.

The mashing of the straw via circulation pumps inevitably leads, in contrast, to an effect that balances out this circumstance. A drawback of the proposed approach is the exacting apparatus-related structure. The mass that is to be mashed is compacted via moving equipment in the reactor itself (expenditure of energy) and has to routed through a cooling unit that is specially designed for this via special pumps that have to be acid-proof as well as being capable of pumping solids. In contrast to that, the classic process makes do with a pump for the liquids that are to be passed through, without movable fixtures in the reactor and without cooling units.

SUMMARY

The invention relates to the hydrolytic breakdown of plant biomasses via hydrohalic acids, preferably so-called hydrochloric acid. Ligneous biomasses were preferably hydrolyzed in the past because other types of biomasses, for instance straw, are only able to be filled into the reactors with a very low density and they tend towards compacting in the course of the process. The invention solves this problem with two modifications. First of all, pelletizable biomasses are completely or partially loaded in the form of pellets and a heavily increasing filling density is achieved because of that. Secondly, the hydrolysis reactors are tilted, preferably arranged between 30° and 60°, and compacting is prevented. The economic effectiveness of both modifications is to be determined in practical tests for every pelletizable biomass. It is possible that one of the two modifications can be omitted.

DETAILED DESCRIPTION

The Invention

The invention that is described here makes an adaptation of the classic process possible in a very simple way, so that annual or weakly lignified plants can be saccharified in accordance with the essential feature of the classic process, the passage through a liquid phase by a standing solid phase, without causing a substantial increase in the investment expense.

Description of the Invention

The invention described here is essentially based on two principle modifications.

The first modification is based on the circumstance that weakly lignified biomasses can usually be pelletized. This means that they are compacted before being filled into the hydrolysis reactor. The corresponding compacting unit, accordingly, does not have to be acid-proof, which is likely to lead to significant cost savings. The density of the filling of straw, for example, can therefore be increased by a factor of 8. That would roughly correspond to a one-half reduction of the reactor volume to be installed vis-a-vis the traditional loading with wood chips (approx. 200-230 kg/m$^3$).

It turns out, though, that an exclusive filling with pellets can lead to a situation in which the pellets swell up to such an extent when acid is introduced that a uniform flow cannot be guaranteed. The acid flows along the reactor walls, alongside the swollen biomass. Complete hydrolysis does not come about (the acid only gets into the biomass in an incomplete way), and acid including the removed materials cannot be carried away from the biomass.

This circumstance is countered, for instance in the case of straw, by filling the reactor with a mixture of chaff and pellets. The proportioning of both components makes it possible to precisely adjust the load. A determination was able to be made via experiments for straw that operation in accordance with the classic process can be ensured with a load of 300 kg/m$^3$. That still corresponds to an increase of 30-50% vis-a-vis the classic loading with wood.

A further aspect relates to the selection and design of the pumps for routing the liquids through the reactor. Theoretically, it should be possible to achieve greater bulk densities when the pumps that are used (or the technical prerequisites corresponding to them) overcome the increased loss of pressure caused by the more dense filling without a uniform flow of the liquids being put at risk by the filling. This variability in the design is, however, not based on the core idea of increasing the bulk density via a defined addition of pellets.

The second modification of the classic process is based on a clarification of the mechanism causing a "caking" of the lignin layer during the hydrolysis of the weakly lignified biomasses. The behavior of the solid residue during the hydrolysis was able to be observed in detail in glass containers in the laboratory. The crucial effect is to be described below with the aid of a simplified presentation of the hydrolysis process.

DETAILED DESCRIPTION OF THE PREFERRED EMBODIMENTS

A filled reactor is a prerequisite. The first phase starts with the slow introduction of the acid. Diffusion into the plant material comes about while it is being introduced; the hydrolytic process immediately sets in. The first phase ends when the reactor is completely filled with acid; the hydrolysis is regarded as being complete in a technical sense. The solid residue has a lower density at this point than the surrounding liquid. A floating situation more or less comes about in the reactor. The strength of the solid residue is fundamentally diminished because the cellulose composite has been extracted by the acid.

The second phase starts with the introduction of water from above and the displacement of the acid according to the density principle. This means that there will ideally not be any mixture of the hydrolysate solution having a heavier specific weight with the water having a lighter specific weight when there is a correspondingly slower and more even introduction.

This means that the phase boundary between the heavier and the lighter phases moves through the reactor starting at the top and consequently also moves through the solid residue. As mentioned above, the density of the residue is less than that of the hydrolysate. It is, however, substantially greater than that of the water coming from above. The portion of the solid residue in the water accordingly "presses" downward, whereas the portion floating in the hydrolysate makes its way upwards. A compression consequently comes about at the phase boundary. When the introduction is too fast, that could lead to a situation in which the displacement is no longer uniform along the entire tube cross section. The phase boundary accordingly moves along the wall more quickly than it does in the interior of the solid residue.

This effect can be countered, however, by introducing the water in a correspondingly slow manner. The second phase is concluded when the upwards and downwards forces cancel each other out at the phase boundary. At that moment, the lignin body drops downwards together with the phase boundary. This takes place until the lignin body reaches the bottom floor of the reactor. The movement of the lignin body stops, but not the movement of the phase boundary. The pressure of the material along the phase boundary is now continually increasing because the portion of the lignin body in the water phase is continually increasing.

The lignin compound remaining in the reactor after the hydrolysis now has different strengths depending on the biomass. The lignin compound of wood proves in practice to be strong enough that the flow of the liquids is not hindered. That is different in the case of weakly lignified biomasses like straw, however. The lignin compound is continuously compacted, so a plug forms in practice on the lower end of the lignin body that only has a flow around it laterally in the best case. In the worst case, a blockage comes about. This effect was expressed as "caking" in the above-mentioned patent.

The technical solution seems to be very simple, but it only became evident when the mechanism presented here was analyzed in a precise way. The problem of compacting in the process of the acid displacement is remedied by not arranging the hydrolysis reactors to be vertical, but instead arranging them to be tilted at a certain angle. This arrangement does not hinder the displacement of the acid according to the density principle at all, because the process is carried out very slowly. Moreover, it has several advantages.

1. The entire weight of the lignin compound is distributed along the lower lateral wall and no longer solely on the floor of the reactor. The compressing effect during the displacement is reduced. In terms of the design, this effect can be supported by providing modifications on the wall, for instance notches, on the lower lateral wall that prevent the lignin residue from sliding off.

2. The dropping of the phase boundary is reduced with the same volumetric flow, because the cross-sectional area has increased. That is important because it keeps the acid phase and aqueous phase from mixing.

3. Longer reactors can be built with the same total height of the overall reactor design, which will either lead to an increase in the overall load per reactor or to a better ratio of length to diameter. The longer a reactor with reference to the diameter, the greater the volume that an arbitrary volume element has to flow through; it will therefore have a saccharifying effect on fresh biomass.

With the aid of the two measures described here, it is possible in the hydrolysis of weakly lignified biomasses, for instance straw, to substantially (factor of 3-5) increase the load of the reactors, to remedy compacting problems as reported in the past and to nevertheless retain the classic process principle by routing a regime of hydrochloric acid with very diverse concentrations and water through a solid phase of plant biomass and, in the process, hydrolyzing the cellulose in the plant biomass.

These measure will take different forms in practice depending on the biomass. That is why only a guideline value between 30° and 60° can be provided for the degree of tilt of the reactors. The same applies to the mixing ratio of the compacted biomass and the non-compacted biomass. The precise design form has to be determined with corresponding experiments. If it turns out that a certain biomass can be economically hydrolyzed in upright reactors and without pelleting, the process that is already known will therefore be used. The invention that was made here would then be irrelevant. That could well be the case for heavily lignified biomasses.

Accordingly, it could also be possible in the sense of the method presented here that only one of the above-mentioned modifications will turn out to be economically viable and will therefore solely determine the process.

The term pelletize is to be defined once again here to provide a more precise description of the method and to therefore demarcate the method proposed here vis-a-vis other processes. This involves a compacting of biomass with the objective of creating individual bodies, so-called pellets, that have enough strength in and of themselves to be able to be used in large quantities as bulk goods.

The invention claimed is:

1. A method for the hydrolysis of plant biomass via hydrohalic acid dissolved in water to form a hydrolyzed biomass in such a manner that there is a breakdown and extraction of carbohydrates existing in plants in the form of cellulose, hemicellulose, starch and/or oligomerized carbohydrates that are depolymerized by the hydrohalic acid and dissolved in the hydrohalic acid, forming a hydrolysate solution, comprising the steps:

the hydrohalic acid is routed in the form of a liquid phase into at least one reactor filled with the biomass until said at least one reactor is filled with hydrohalic acid, the hydrohalic acid is diffused into the biomass and the hydrolysis is concluded with the formation of a hydrolysate solution during a first phase, and during a second phase, water is introduced into the at least one reactor from above and the hydrolysate solution with a lower density than water is displaced downwards, wherein the water is introduced so slowly and uniformly that the hydrolysate solution having a heavier specific weight is not mixed with the water having a lighter specific weight and a changing, essentially horizontal phase boundary forms between the water and the hydrolysate solution, moves through solid residue of the hydrolyzed biomass and pushes the hydrolysate solution downwards out of the hydrolyzed biomass and out of the at least one reactor.

2. The method according to claim 1, wherein the at least one reactor is tilted 30° to 60° from the upright position.

3. The method according to claim 1, wherein compacted biomass is provided for hydrolysis and is put into the at least one reactor in a mixed form with non-compacted biomass in a ratio, at a minimum, such that a flow of liquid in the at least one reactor is not obstructed through swollen biomass when the compacted biomass swells up during the hydrolysis.

4. The method according to claim 3, wherein the compacted biomass exists in the form of pellets.

5. The method according to claim 1, wherein weakly lignified biomass is provided as plant biomass whose lignin compound remaining after the hydrolysis has strength that is so low that it has a tendency towards plug formation in the at least one reactor during the second phase.

6. The method according to claim 1, wherein the biomass has a density of at least 300 kg/m$^3$.

7. The method according to claim 1, wherein the power of pumps or technical devices that bring about the flow of water and the liquid phase through the biomass is adapted to the bulk density of the biomass.

\* \* \* \* \*